United States Patent [19]
McCay, Jr.

[11] 3,797,614
[45] Mar. 19, 1974

[54] AUTOMATIC UNIDIRECTIONAL BRAKE

[75] Inventor: Frank V. McCay, Jr., Salt Lake City, Utah

[73] Assignee: Envirotech Corporation, Salt Lake City, Utah

[22] Filed: Sept. 2, 1971

[21] Appl. No.: 177,217

[52] U.S. Cl.............................. 188/134, 192/8 R
[51] Int. Cl................................................. B60t 7/2
[58] Field of Search ....... 188/82.8, 82.84, 110, 134; 192/8 R

[56] References Cited
UNITED STATES PATENTS
| | | | |
|---|---|---|---|
| 710,759 | 10/1902 | Coleman et al.............. | 188/134 UX |
| 1,870,532 | 8/1932 | Schuetz........................ | 188/82.84 X |
| 3,596,740 | 8/1971 | Nau............................... | 188/134 |

Primary Examiner—Duane A. Reger
Attorney, Agent, or Firm—Robert R. Finch; Robert E. Krebs

[57] ABSTRACT

A brake is cooperatively operable with a clutch having an extended, open-ended drum rotating with an input shaft. A brake hub, spaced concentrically about the shaft at the drum's open end, carries a reactor plate and a first set of friction plates splined thereto, and the hub is capable of only limited rotation relative to a stationary reaction plate facing the reactor plate because of bearing balls interposed between the plates in complemental ramp seats. The clutch drum carries a second set of annular friction plates splined in its extended end to sandwich between the first set of friction plates. The clutch drum and second set of friction plates rotate freely about the hub in the driving direction but, upon reversal of rotation, frictional drag between the friction plates slightly rotates the hub to move the balls up their ramps to wedge the reactor plate away from the reaction plate, whereupon the reactor plate urges the first set of friction plates to clamp the second set to stop drum rotation.

6 Claims, 4 Drawing Figures

PATENTED MAR 19 1974

INVENTOR.
FRANK V. MCCAY JR.

BY *Robert E. Krebs*

ATTORNEY

INVENTOR.
FRANK V. MCCAY JR.

3,797,614

AUTOMATIC UNIDIRECTIONAL BRAKE

FIELD OF THE INVENTION

This invention relates to a safety brake and, more particularly, to an automatic, unidirectional, disc-type brake for use in hoist systems such as are found in mining machines. The brake may be connected to a drive shaft in such systems to allow a load to be raised by a motor but to prevent reverse rotation of the shaft; in other words, the brake is a mechanical lock holding a load in position without putting a reverse torque on the motor. Typically, the brake is utilized in cooperation with a clutch connected to the drive shaft so that upon disengagement of the clutch the load moves freely. Prior brakes in such an environment have been rather unreliable and have required excessive maintenance; the brake of this invention provides increased reliability with reduced maintenance.

OBJECTS OF THE INVENTION

An important object of the invention is to provide a reliable, maintenance-free brake for use with hoist systems;

Another object is to provide an unidirectional brake for use in cooperation with a clutch in a hoist system;

Yet another object is to provide an automatic, unidirectional brake for use in a hoist system.

BRIEF DESCRIPTION OF THE DRAWINGS

The above and other objects and advantages of the invention will be apparent from the following description and appended illustrations in which.

DETAILED DESCRIPTION OF THE INVENTION

Figure 2:
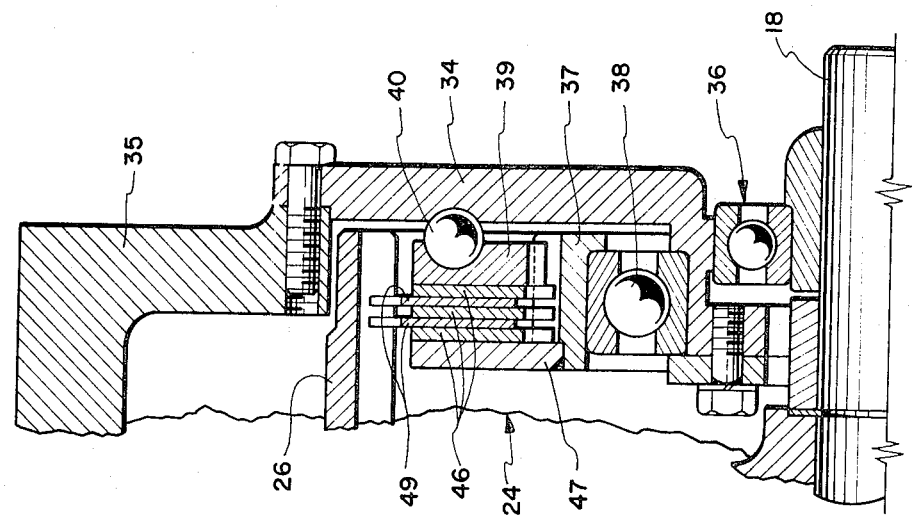
FIG. 2 is a partial, sectional elevation showing the brake of FIG. 1.
Figure 1:
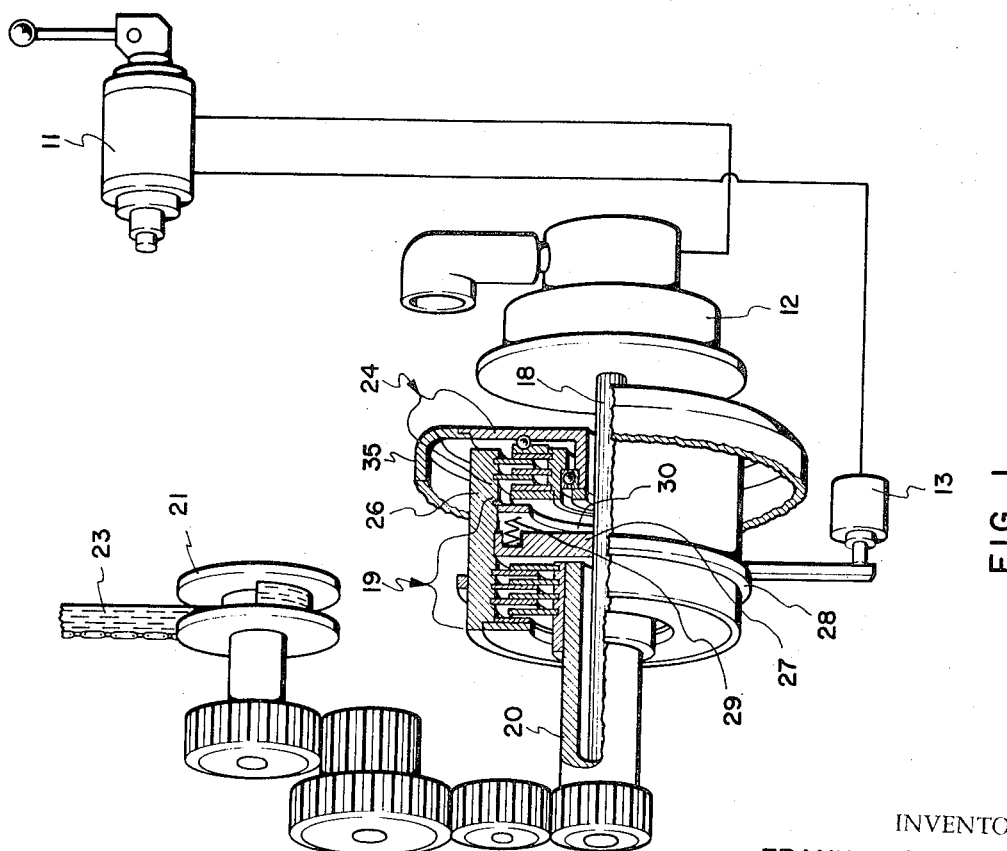
FIG. 1 is a diagrammatical view illustrating operation of a brake in cooperation with a clutch and attendant hoist apparatus according to the invention.

In the illustrated embodiment, a valve 11 selectively controls both an air motor 12 and a clutch control 13. The motor rotatably drives an input shaft 18 which is functionally connected through a clutch assembly 19 to an output shaft 20 to supply power, as through a gear train, to a takeup reel 21 to which a flexible draft means, such as chain 23, is secured. A brake 24 is provided to prevent inadvertent reverse rotation of the shaft and thus to hold a load in a selected position.

The brake 24 may be best understood by first briefly describing the operation of the clutch 19 with which is is associated. The clutch drum 26 is splined to and rotatable with a clutch hub 27 which is fixed to rotate with the input shaft 18. When the clutch is engaged, the input shaft 18 and the output shaft 20 rotate together; when disengaged, output shaft 20 rotates independently of the input shaft 18. To disengage the clutch, the control 13 is actuated to act on a circumferential flange 28 to urge the drum 26 axially against springs 29 to release the clutch plates. As shown, the clutch is normally engaged by means of the clutch spring 29 interposed between an annular flange 30 fixed to the drum and the clutch hub 27.

As illustrated, the clutch drum is extended rearwardly to become a part of the brake 24. A circular reaction plate 34 (FIGs. 2–4) is located adjacent to the extended end of the drum and encircles the input shaft 18. The reaction plate is secured to a fixed member such as housing 35, while the input shaft 18 is journalled for rotation on bearings 36 at the central portion of the plate. A splined brake hub 37 also encircles the input shaft 18 and is supported on the reaction plate by a bearing 38 fixed thereon against axial movement.

The brake hub carries a circular reactor plate 39 splined thereto for axial movement thereon in face-to-face relationship to the reaction plate 34. Although the brake hub is journalled for full rotation on a bearing 36, in operation, rotation of the brake hub relative to the reaction plate is restricted to a few degrees by a series of bearing balls 40 interposed between the reaction plate and reactor plate in complemental ramp seats 41a and 41b.

Figure 3:
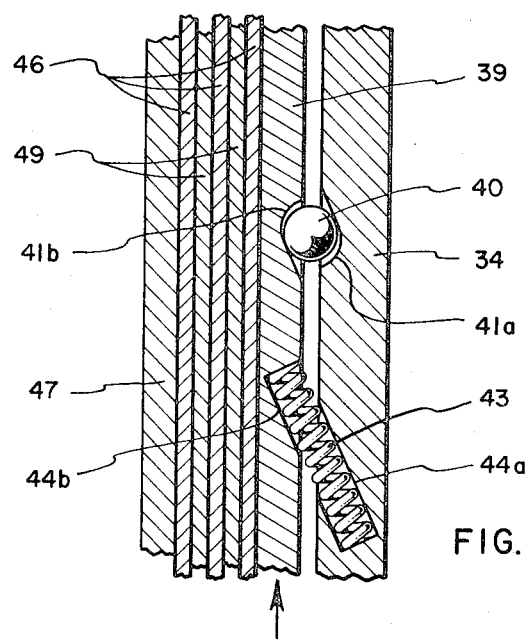
FIG. 3 is a partial sectional view of the brake of FIG. 2 taken on a plane as indicated by the line 3—3 in FIG. 4, arrows 3—3 of FIG. 4, looking in the direction indicated by the arrows.
Figure 4:
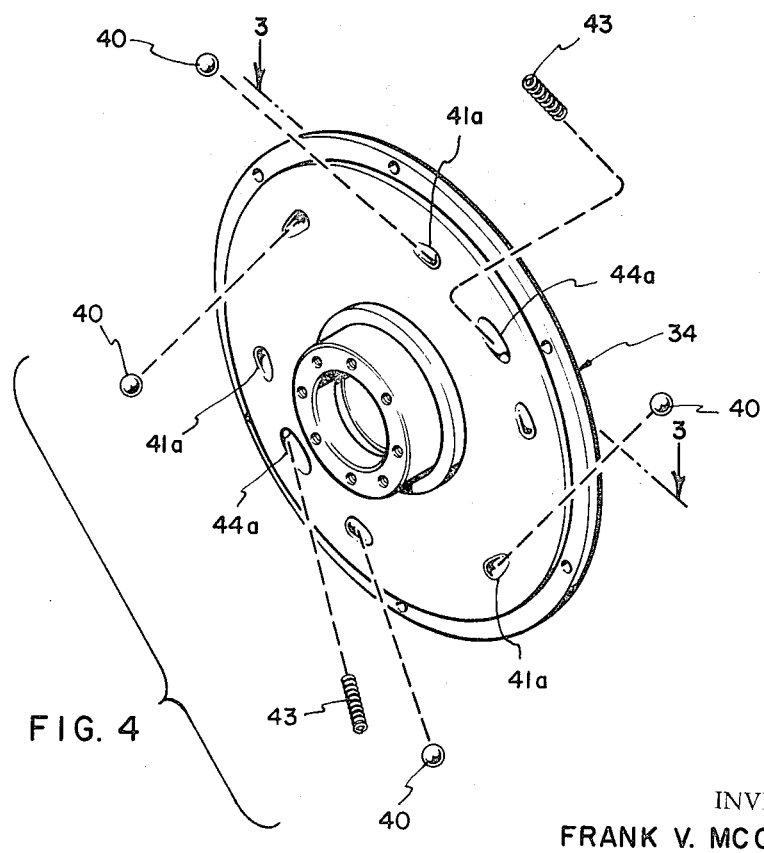
FIG. 4 is an isometric view of the reaction plate included in FIG. 2.

As may be seen from FIG. 3, upon rotation of the reactor plate 39 in the direction indicated by the arrow (with the reaction plate 34 remaining stationary), the balls 40 will roll up the ramps, thus wedging the plates apart. Relative rotation of the plates in the opposite direction allows the balls to roll down the ramps to the bottom of their seats. As shown in FIG. 4, a plurality of ramp seats are spaced about the center of the reactor plate and a complemental series is provided in the reaction plate. Energizing springs 43 are arranged in corresponding pairs of angled bores 44a and 44b in the facing sides of the plates 34 and 39 to bias the plates slightly apart. The angled bores permit the spring to exert a continuous biasing pressure which not only spreads the reactor and reaction plates apart, but also maintains a continuous but light frictional engagement between the reactor plate 39 and associated brake plates 46 and 49 to insure that, upon the slightest reverse rotation of the drum 26, the reactor plate 39 will rotate to roll the balls up the ramp and thus set the brake. Operation of the brake is more fully described below.

Location of the springs in the angled bores is important because were the springs located in bores perpendicular to the plate faces, relative movement of the plates would result in twisting rather than compressing of the spring.

The brake plates 46 and 49, more particularly, include a first and second set of interposed, circular friction plates. The first or inner set consists of plates 46 which are splined onto the brake hub for rotation therewith and axial sliding thereon clear of the drum 26. An annular backing plate 47 is fixed to the outer end of the brake hub to limit axial travel of the first set of friction plates. The second or outer set consists of friction plates 49 which are secured at their outer peripheries to the inner surface of the drum 26 by splines so that the plates 49 may move axially thereof. A central aperture through the outer set of friction plates is large enough to allow free rotation about the brake hub therein. The individual friction plates of both the inner and outer sets are arranged alternately with respect to each other.

As previously explained, in the assembled position with the reactor and reaction plates in close proximity and with the balls 40 deeply seated, the springs 43 maintain light friction between the inner and outer friction plates 46 and 49. In the driving mode, the motor rotates both the input shaft 18 and the clutch drum 26, and the inner and outer plates rotate freely relative to each other. However, the brake automatically actuates if there is any rotational reversal of the input shaft 18 while the clutch is still engaged. Reversal may occur if the motor stops or when too heavy a load is imposed on the system through the chain. With the clutch engaged, reversal of the input shaft 18 will cause the clutch drum to reverse; then, since the interposed friction plates have a slight mutual drag, the inner plates 46 cause the hub and reactor plate to rotate slightly relative to the reaction plate. Consequently, the balls roll up their ramps to force the reaction and reactor plates apart, and the reactor plate urges the friction plates axially together between the reactor plate and the backing plate. Thus, the outer plates 49 are rigidly clamped or braked against rotational movement between the inner friction plates 46. Since the outer plates are splined to the clutch drum, the drum too will be braked. A load, functionally connected to the drum through the clutch will consequently be maintained in position. To lower the load, the clutch is merely disengaged.

I claim:

1. An automatic brake for preventing reverse rotation of a rotary shaft comprising: a drum fixed coaxially on the shaft and having an open end; a stationary reaction plate concentric to said shaft adjacent the open end of said drum; a hub spaced concentrically about said shaft substantially inside the open end of said drum and mounted upon said reaction plate for limited rotation relative thereto; at least one outer friction plate fitted concentrically into said drum end for rotation therewith about said hub, said outer plate being axially slidable in said drum; at least one inner friction plate mounted on said hub to be axially slidable thereon and rotatable therewith inside said drum; a reactor plate mounted on said hub to be axially slidable thereon and rotatable therewith and in face-to-face relationship with said reaction plate; retaining means fixed on said hub and positioned for limiting axial travel of said friction plates between said retaining means and said reactor plate; and wedging means interposed between said reaction plate and said reactor plate which is operable in only one direction of rotation of said shaft to urge said reactor plate axially away from said reaction plate thereby to press said inner and outer friction plates into frictional engagement between said reactor plate and said retaining means thereby braking rotation of said drum and shaft.

2. An automatic brake according to claim 1, including a plurality of inner friction plates and a plurality of outer friction plates interposed therebetween.

3. An automatic brake according to claim 1 wherein said wedging means includes a plurality of springs interposed between said reaction plate and said reactor plate biasing the same apart to maintain slight friction between said at least one inner friction plate and said at least one outer friction plate.

4. An automatic brake according to claim 2 wherein said springs are arranged in corresponding pairs of angled bores in the facing sides of the reaction and reactor plates.

5. An automatic brake according to claim 4 wherein said wedging means further includes ball-in-ramp means.

6. An automatic brake according to claim 1, including a plate clutch assembly mounted on said input shaft, wherein the clutch drum of said clutch assembly is coextensive with said drum, and an output shaft functionally operable with said clutch.

\* \* \* \* \*